Figure 1A:
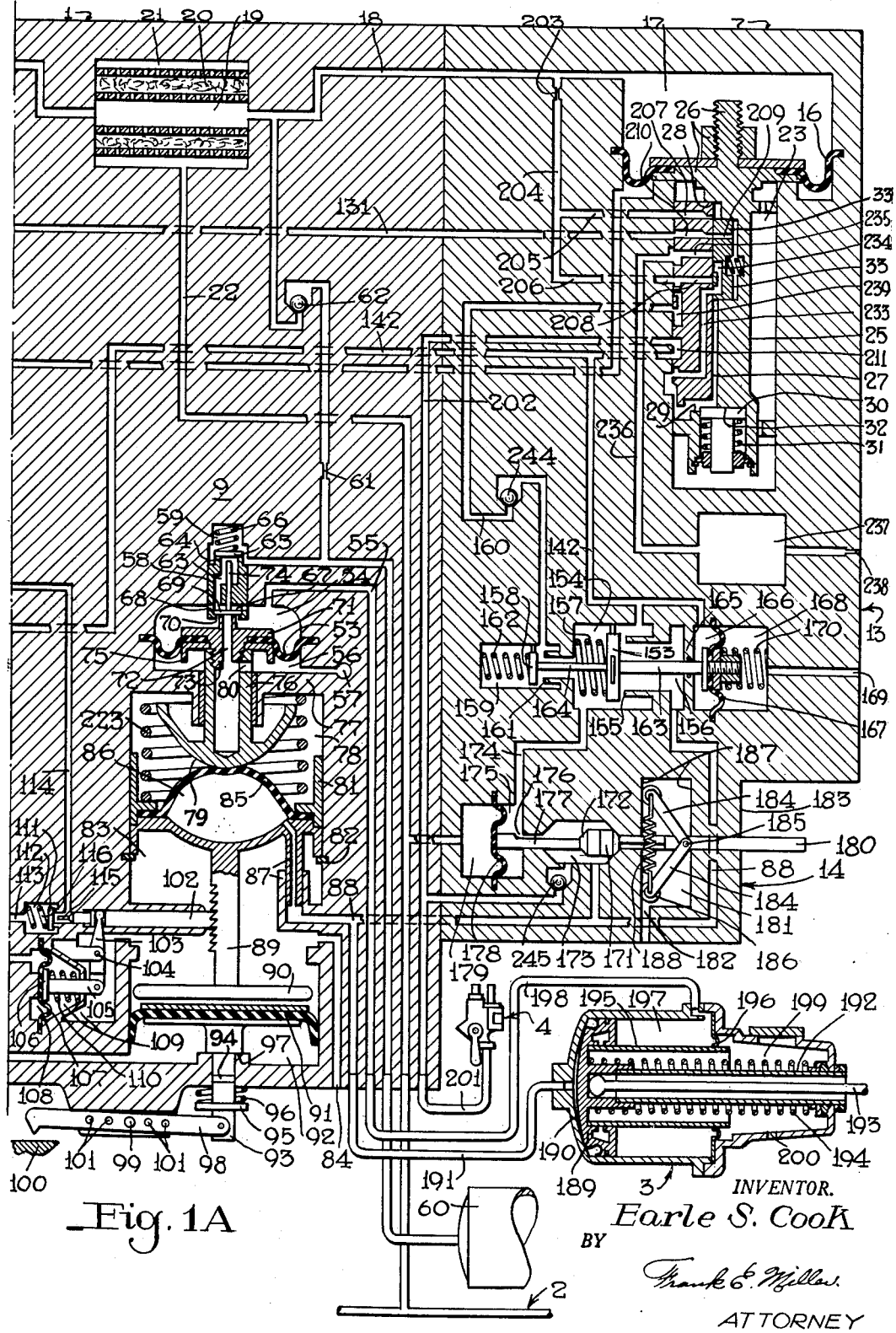

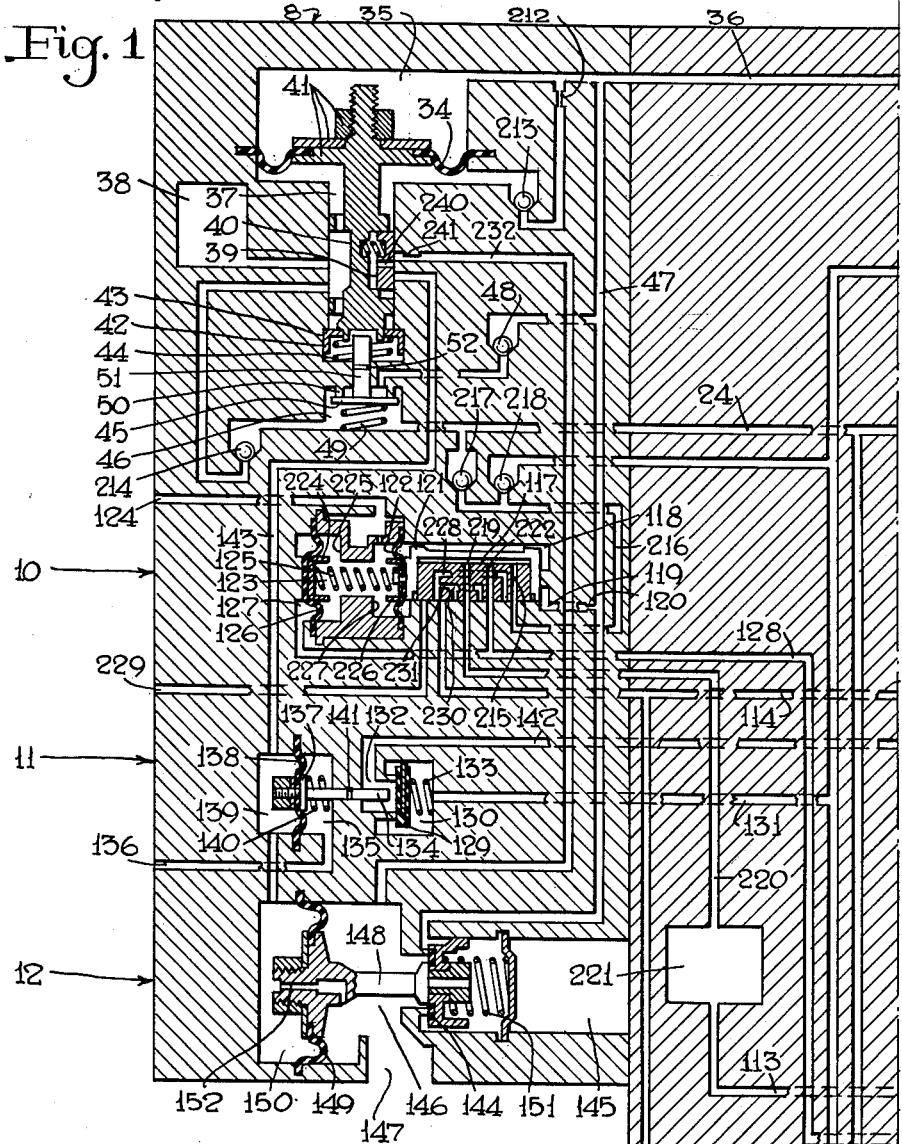

Oct. 25, 1955     E. S. COOK     2,721,768
FLUID PRESSURE BRAKE APPARATUS
Filed July 27, 1951     2 Sheets-Sheet 2

INVENTOR.
Earle S. Cook
BY
Frank E. Miller
ATTORNEY

United States Patent Office 2,721,768
Patented Oct. 25, 1955

2,721,768
FLUID PRESSURE BRAKE APPARATUS

Earle S. Cook, Forest Hills, Pa., assignor to Westinghouse Air Brake Company, Wilmerding, Pa., a corporation of Pennsylvania Application July 27, 1951, Serial No. 238,918

18 Claims. (Cl. 303—22)

This invention relates to fluid pressure brakes and more particularly to the type for use on railway cars.

One object of the invention is the provision of an improved, relatively simple, low cost and highly reliable brake controlling valve device for this use and which may embody means to provide for braking of a car in accordance with the weight of load carried by the car.

Another object of the invention is the provision of such a brake controlling valve device in which piston ring leakage from the brake pipe to the storage reservoirs is eliminated, which will permit more positive serial transmission of a reduction in brake pipe pressure through a train; which will facilitate release of brakes on trains even longer than now commonly operated; which will permit, if desired, use of brake equipments with smaller brake cylinders and storage reservoirs and correspondingly lighter brake rigging and lighter and cheaper car trucks than at present used and as may soon be possible with the development of brake shoes having improved frictional characters; and which will reduce the air consumption of a train to permit faster and more uniform charging of a train and hence better control of release of brakes and operation of larger trains if such be desired.

A still further object of the invention is the provision of such a brake controlling valve device in which the possibility of failure due to foreign matter which may be present in the air stream is substantially eliminated; in which the time between cleaning periods can be greatly extended with resultant reduced cost of maintenance and fewer men required for such work and which will not require such highly skilled workmen to repair and maintain the device as has been necessary in the past.

Other objects and advantages will become apparent from the following more detailed description of the invention.

In the accompanying drawings; Figs. 1, 1A, when the right-hand side of Fig. 1 is matched to the left-hand side of Fig. 1A, is a diagrammatic view of a fluid pressure brake apparatus embodying the invention; and Fig. 2 is a diagrammatic view of a modification of the invention.

DESCRIPTION

For the purpose of simplification and to facilitate an understanding of the invention, the various parts of the brake apparatus embodying the invention have been shown in the drawings in their functional relation with each other, since the actual construction and design of the apparatus constitutes no part of and is immaterial to the invention and may follow conventional air brake practice.

As shown in the drawing, the improved brake apparatus comprises a brake controlling valve device 1 arranged to be controlled by variations in pressure in a brake pipe 2, a load compensating brake cylinder device 3, the usual brake cylinder pressure retaining valve device 4, auxiliary reservoir 5 and emergency reservoir 6.

The brake controlling valve device 1 comprises a service application valve device 7, an emergency application valve device 8, a load compensating valve device 9, a compensating control valve device 10, an emergency high pressure valve device 11, a brake pipe vent valve device 12, a combined quick service limiting and emergency inshot valve device 13 and a combined emergency application delay and brake cylinder release valve device 14.

The service application valve device 7 comprises a flexible diaphragm 16 clamped around its peripheral edge in the casing of the device. At one side of diaphragm 16 is a control chamber 17 open to brake pipe 2 through a passage 18, a chamber 19 within an annular air strainer 20, through said strainer, an annular chamber 21 encircling said strainer and thence through a passage 22. At the opposite side of diaphragm 16 is a valve chamber 23 which is in constant communication with the auxiliary reservoir 5 via a passage 24. A stem 25 slidably mounted in the casing within chamber 23 is connected at one end to the diaphragm 16 centrally thereof by conventional means 26 for movement with said diaphragm. A main slide valve 27 contained in chamber 23 and arranged to slide on a seat in the casing is mounted with a certain degree of lost motion between a shoulder 28 provided on stem 25 adjacent the diaphragm 16 and a shoulder 29 on said stem adjacent its opposite end. In this opposite end of stem 25 there is provided a plunger 30 normally projected by a spring 31 to a position defined by contact with a shoulder 32 on said stem and in which position said plunger is spaced slightly ahead of shoulder 29 for contact with the adjacent end of said valve. An auxiliary slide valve 33 slidably mounted on a seat provided on main slide valve 27 is disposed in a recess in the stem 25 for movement therewith.

The emergency application valve device 8 comprises a flexible diaphragm 34 clamped around its peripheral edge in the casing and at one side of which there is a chamber 35 open to brake pipe 2 via a passage 36 and the air strainer 20. At the opposite side of diaphragm 34 is a valve chamber 37 open to a quick action chamber 38 and containing a slide valve 39 mounted on a seat in the casing and disposed in a recess in a stem 40 for movement therewith. The stem 40 is slidably mounted in the casing in valve chamber 37 and has one end connected to the diaphragm 34 centrally thereof by conventional securing means 41 for movement by said diaphragm. A plunger 42 slidably mounted in the casing coaxial with stem 40 is arranged for contact with the opposite end of said stem and is constantly urged toward a stop shoulder 43 by a spring 44. Disposed below the lower end of stem 40 is a poppet type backdump valve 45 contained in a chamber 46 and arranged to control communication between said chamber and a passage 47 via a check valve 48. The chamber 46 is open to the auxiliary reservoir 5 via passage 24, and passage 47 is open to the brake pipe 2 via the passage 36 and air cleaner 20. The check valve 48 is arranged to permit flow of fluid under pressure only in the direction from chamber 46 to passage 47. A spring 49 in chamber 46 acts on valve 45 to urge it into contact with a seat 50 for closing the communication controlled thereby. For unseating the check valve 45 from seat 50 a plunger 51 slidably mounted in a bore in the casing with one end contacting the valve 45 has its other end disposed in valve chamber 37 for engagement by the lower end of stem 40 upon movement of said stem and plunger 42 against spring 44. A resilient ring seal 52 carried by the stem 51 slidably engages the wall of the casing bore in which said stem operates to prevent leakage of fluid under pressure between chamber 37 and passage 46.

The load compensating valve device 9 generally may be like that disclosed in U. S. Patent No. 2,450,464 issued to A. J. Bent on October 5, 1948 and comprises a flexible diaphragm 53 clamped around its peripheral edge in the casing. At one side of diaphragm 53 is a chamber 54 open to a brake cylinder load compensating passage 55 and at the opposite side of a chamber 56 open to atmosphere through a port 57. Secured in a bore arranged coaxially with diaphragm 53 and open at one end to chamber 54 is a sleeve 58 at the opposite end of which is a chamber 59 open to a load compensating reservoir 60 and also connected through a charging choke 61 to the brake pipe passage 18 via a check valve 62 which is arranged to permit flow of fluid under pressure only in the direction from said passage to said reservoir.

The sleeve 58 has a longitudinally extending passageway 63 open at one end through an annular seat 64 to chamber 59 which contains a supply valve 65 arranged to cooperate with said seat for closing communication between chamber 59 and said passageway, a spring 66 in said chamber acting on said valve for urging it to said seat. The opposite end of passageway 63 terminates in a chamber 67 which is open through a port 68 to chamber 54 and contains a release valve 69 adapted to be supported around its edge on an annular shoulder 70 provided at the lower end and interiorly of chamber 67. A follower 71 mounted on the adjacent side of diaphragm 53 has an axial bore 72 extending therethrough and through an integral stud portion 73 projecting from one face thereof. The bore 72 also extends in the opposite direction through a raised portion of the follower which projects into the space within shoulder 70, a valve seat being provided on the end of said raised portion around the end of said bore for sealing engagement with the release valve 69. Slidably mounted in a bore provided axially in the sleeve 58 is a pin 74 one end of which engages the valve 69 and which is adapted to be moved thereby to unseat the valve 65.

A follower 75 disposed in chamber 56 is applied over the stud portion 73 of follower 71 against the adjacent face of diaphragm 53 and one end of a stem 76 screw-threaded on said stud portion securely clamps the central portion of the diaphragm between the two followers 71, 75. The stem 76 is arranged in coaxial relation to the diaphragm 53 and extends through chamber 56 and a suitable bore in a partition wall 77 into a chamber 78 wherein a follower 79 is provided on its opposite end. The bore 72 in the follower 71 is open through a passage 80 in stem 76 to atmosphere via chamber 56.

The chamber 78 is provided at one side of a plunger 81 which is slidably mounted in a bore in the casing, a ring 82 in the wall of said bore being provided for engagement by said plunger to limit movement thereof in a direction away from follower 79. At the opposite side of plunger 81 is a chamber 83 which is open to atmosphere through a passage 84. Chamber 78 is also open to atmosphere via slight clearance present, but not shown in the drawing, between the stem 76 and plunger 81 and the walls of the casing bores in which they are disposed and thence via chambers 56 and 83.

An inverted frustro-conical like flexible diaphragm 85 disposed in chamber 78 in coaxial relation to follower 79 is clamped around its peripheral edge to the plunger 81 while its closed end engages the adjacent, preferably paraboloidal, face of said follower. Between the interior of diaphragm 85 and plunger 81 there is formed a pressure chamber 86 adapted to receive fluid under pressure for applying a control force on said diaphragm against the follower 79 which depends not only upon the pressure of such fluid but also the area of contact between said diaphragm and follower. The plunger 81 being slidably mounted in the casing, the area of contact between the diaphragm 85 and follower 79 may be varied according to the position of said plunger relative to said follower, such area being least with the plunger 81 in contact with ring 82 and being adapted to be increased in proportion to movement of said plunger toward said follower. Chamber 86 is open through a passageway in a slip joint connection 87 with a casing passage 88 by way of which fluid under pressure is adapted to be supplied to and released from said chamber.

For varying the position of plunger 81 relative to follower 79 from the position in which it is shown in the drawing defined by contact with ring 82, said plunger is connected by a stem 89 to one side of a plate 90, the opposite side of which is adapted to be engaged by one face of a piston 91. At the opposite face of piston 91 is a pressure chamber 92 to which fluid under pressure is adapted to be supplied for actuating said piston into contact with plate 90 and through said plate and stem 89 move the plunger 81 in an upward direction. The piston 91 is connected to one end of a rod 93 extending to the exterior of the casing through a bore in said casing and said rod carries a sealing ring 94 having sealing and sliding contact with the wall of said bore to prevent leakage of fluid under pressure from chamber 92 along said stem to atmosphere. Outside of the casing a washer 95 secured to the stem 93 is engaged by one end of a spring 96, the opposite end of which bears against said casing, for urging the piston 91 to a normal position, preferably out of contact with plate 90 and which may be defined by contact between a shoulder 97 on the stem and the casing.

In a manner to be later described, the piston 91 is adapted to be moved upwardly by fluid under pressure supplied to chamber 92, upon charging of the brake apparatus, to a position corresponding to the lading carried by a car for correspondingly adjusting the position of plunger 81 and diaphragm 85 relative to the follower 79. To thus limit the movement of piston 90, the rod 93 may be connected to one end of a lever 98 which intermediate its ends is fulcrumed on a pin 99 carried by the valve casing. The opposite end of lever 98 is arranged to engage an unsprung portion 100 of a car truck upon movement of piston 91 by fluid under pressure in chamber 92, it being understood that the brake controlling valve device 1 and lever 98 are carried by a sprung portion of the car.

It will thus be seen that the extent of movement of piston 91 by fluid under pressure supplied to chamber 92 will be limited by contact of lever 98 with the unsprung portion 100 of the car truck and will vary in proportion to the degree of load on the car; being a maximum amount with the car empty and a minimum amount with the car fully loaded. The position of plunger 81 in the casing and the area of diaphragm 85 which will contact the follower 79 upon movement of piston 91 by fluid under pressure will therefore vary according to the load on the car, providing a minimum area of contact with the car fully loaded and a maximum area of contact with the car empty.

In different makes of cars, the load supporting springs vary with respect to deflection between empty and full loaded conditions of the cars. In order that the piston 91, plunger 81 and diaphragm 85 will assume a proper position according to load on these different cars, it is therefore necessary to provide for varying the ratio between the two arms of lever 98, and this may be accomplished by the provision of a suitable number of holes 101 in said lever adapted to align with corresponding holes (not shown) in the casing of the valve device 1 to receive the fulcrum pin 99.

The plunger stem 89 is provided on one side with teeth arranged to receive teeth on the end of a locking plunger 102 to lock the plunger 81 and diaphragm 85 in a position to which they are adjusted by piston 91. The plunger 102 is slidable in a suitable bore in the casing in a direction at right angles to the axis of the plunger stem 89. A lever 103 having one end connected to plunger 102 is fulcrumed between its ends on a casing carried fulcrum pin 104 and its opposite end is connected to a rod 105 projecting from a diaphragm follower 106. The follower 106 engages one side of a flexible diaphragm 107 at the opposite side of which is a pressure chamber 108. At the side of diaphragm 107 engaged by the follower 106 is a chamber 109 open to atmosphere via chamber 83 and containing a spring 110 for actuating the follower 106, and lever 103 to move the plunger 102 into locking engagement with the stem 89. Upon supply of fluid at sufficient pressure to chamber 108, the diaphragm 107 is adapted to deflect against spring 110 for actuating lever 103 to draw plunger 102 out of locking engagement with stem 89.

A check valve 111 contained in a chamber 112 is arranged to control flow of fluid under pressure in the direction from a passage 113 to a passage 114. The check valve 111 is disposed in the path of movement of a projection 115 of the plunger 102 so as to be unseated upon movement of said plunger out of locking engagement with stem 89. With plunger 102 in locking engagement with stem 89, check valve 111 is adapted to be seated by a spring 116.

The compensating control valve device 10 comprises a slide valve 117 contained in a chamber 118 which is open through a passage 119, and a choke 120 to passage 47 and thereby to brake pipe 2 via passage 36. The slide valve 117 is mounted in a recess in a stem 121 for movement therewith and one end of said stem is connected to the central portion of a flexible diaphragm 122, which is clamped around its periphery in the casing and subject on the one side, it will be noted, to pressure of fluid in chamber 118. At the opposite side of diaphragm 122 is a chamber 123 open to atmosphere through a port 124 and containing a spring 125 one end of which acts on the diaphragm 122 for deflecting it and moving the slide valve 117 to the position in which they are shown in the drawing when pressure of fluid in chamber 118 is no greater than, for example, twenty pounds.

The opposite end of spring 125 is supported by a flexible diaphragm 126 of somewhat greater area than diaphragm 122 and arranged in coaxial relation with the latter diaphragm but spaced therefrom. The diaphragm 126 is exposed at the side engaged by spring 125 to atmospheric pressure in chamber 123 and on the opposite side to pressure of fluid in a chamber 127 which is open to a passage 128 leading to the seat of slide valve 117 and to diaphragm chamber 108.

The emergency high pressure valve device 11 comprises a poppet valve 129 contained in a chamber 130 which is open to a passage 131 connected to the emergency reservoir 6. The valve 129 controls communication between chamber 130 and a chamber 132 and is urged to a communication closing position by a spring 133. A pin 134 slidably mounted in a suitable bore in the casing has one end disposed in chamber 132 for movement into engagement with valve 129 to unseat said valve. The other end of pin 134 is disposed in a chamber 135 open to atmosphere through a port 136 and therein said pin is provided with a follower head 137 engaging one side of a flexible diaphragm 138. The diaphragm 138 is thus exposed on its one face to atmospheric pressure in chamber 135 while at its opposite face is a chamber 139 adapted to receive fluid under pressure for deflecting the diaphragm 138 in a direction to actuate pin 134 to unseat the valve 129. A spring 140 in chamber 135 acts on the head 137 to deflect the diaphragm 138 and move pin 134 in a direction away from valve 129 when fluid under pressure is released from chamber 139 to permit closing of valve 129 by spring 133. A sealing ring 141 carried by pin 134 has sealing and sliding contact with the wall of the casing bore in which said pin operates to prevent leakage of fluid under pressure from chamber 132 to chamber 135. Chamber 132 is connected by a passage 142 to the seat of the service main slide valve 27 and to the combined quick service limiting and emergency inshot valve device 13, while chamber 139 is connected via passage 143 to the seat of the emergency slide valve 39.

The brake pipe vent valve device 12 comprises a vent valve 144 contained in a chamber 145, which is open to the brake pipe 2 via passages 47, 36 and 22, for controlling communication between said chamber and a chamber 146 which is open to atmosphere via a passage 147. The valve 144 is connected to one end of a stem 148 extending through chamber 146 and connected at its opposite end to the center of a flexible diaphragm 149 whereby deflection of said diaphragm by pressure of fluid in a chamber 150, at the side of said diaphragm opposite the atmospheric chamber 146, will unseat said valve. A spring 151 in chamber 145 acts on valve 144 for seating it upon dissipation of fluid under pressure from chamber 150 via a choked control port 152 in the stem 148 opening chamber 150 to chamber 146. Chamber 150 is open to chamber 139 in the emergency high pressure valve device 11 and thence via passage 143 to the seat of the emergency slide valve 39.

In the well-known AB brake controlling valve device, there are provided separate quick service limiting and emergency inshot valve devices. The limiting valve device is for the purpose of limiting quick service flow of fluid under pressure from the brake pipe to the brake cylinder device upon initiating an application of brakes, to a chosen pressure in said brake cylinder device whereby a chosen minimum and uniform service application of brakes will be obtained quickly throughout a train. The emergency inshot valve device operates to permit a rapid flow of fluid to a brake cylinder device on a car to a chosen degree required to cause gentle gathering of slack in a long train before applying the brakes with such force as to stop the train in effecting an emergency application of brakes on the train. In the AB valve device, the quick service limiting valve device thus limits pressure in the brake cylinder device to, for example, ten pounds while the emergency inshot valve device limits the initial fast rate of build-up in brake cylinder pressure to a pressure such as twelve to fifteen pounds. It is the applicant's belief that a compromise can be found between these two different pressures of ten and fifteen pounds which could satisfactorily be employed for both quick service and emergency inshot and to this end provides the combined quick service limiting and emergency inshot valve device 13.

The valve device 13 comprises an emergency inshot valve in the form of a check valve 153 contained in a chamber 154 and arranged to cooperate with a seat 155 for closing a communication of relatively large flow capacity through said seat between passage 142 and a chamber 156 open to the brake cylinder passage 88. A spring 157 acts on the check valve 153 for urging it to its seat 155.

A quick service limiting check valve 158 contained in a chamber 159 open to a quick service passage 160 extending from the seat of the service slide valve 27, is arranged to cooperate with a seat 161 for closing communication between said chamber and chamber 154. A spring 162 in chamber 159 acts on the check valve 158 for urging it to its seat 161. A check valve 244 in passage 160 provides for flow of fluid under pressure therethrough only in the direction to chamber 159.

The two check valves 153 and 158 are aligned one with the other and move in the same direction for seating and unseating, respectively, whereby upon movement of a stem 163 against valve 153 to unseat it, a pin 164 operated by valve 153 will unseat valve 158. Conversely, upon movement of stem 163 in a direction away from valve 153 said valve will be seated by spring 157 and permit seating of valve 158 by spring 162. The stem 163 extends through a partition wall 165 separating chamber 156 from a chamber 166 which is open to passage 142 from the seat of the main service slide valve 27, while its end opposite that engaging valve 153 is connected in chamber 166 to a flexible diaphragm 167 subject on one side to pressure in chamber 166 and thereby in passage 142 while at the opposite side is a chamber 168 which is open to atmosphere through a passage 169. A spring 170 in chamber 168 acts on diaphragm 167 with a certain force such, for example, as to hold the diaphragm in the position for opening valves 153, 158 when pressure of fluid in passage 142 is less than a chosen degree, such as ten pounds. When at or in excess of this chosen degree the diaphragm 167 is adapted to deflect against spring 170 to permit closing of valves 153, 158 by their respective springs.

The combined emergency delay and brake cylinder release valve device 14 comprises two oppositely arranged and engaging poppet valves 171, 172 contained in a chamber 173 which is open to the brake cylinder passage 88. The valve 172 controls a communication between chamber 154 and the brake cylinder passage 88 of such restricted flow capacity as to provide for a gradual application of brakes after an initial rapid slack gathering inshot in effecting an emergency application of brakes, as will be later described, said communication including a passage 174, a chamber 175, and a choke 176 preferably in the form of a groove provided on one side of a stem 177 projecting from valve 172 through a partition wall in the casing into chamber 175. In chamber 175 the end of stem 177 engages one side of a flexible diaphragm 178 at the opposite side of which is a chamber 179 open to brake pipe 2 via passage 22.

The poppet valve 171 has a stem 180 provided with a fluted portion extending through a casing bore into a chamber 181 which is open to atmosphere via a passage 182, said stem extending through said chamber and a bore in a casing wall 183 to the exterior of the casing for manual operation.

In chamber 181 a snap acting pressure exerting device is connected to the valve stem 180, said device comprising two oppositely extending arms 184 pivoted at adjacent ends on a pin 185 carried by said stem. In the opposite end of each arm 184 is a roller 186 adapted to bear against either of two oppositely arranged parallel walls 187 and to be biased against the respective wall by a tension spring 188 connected to the axles of said rollers. The spring 188 will thus urge the valves 171, 172 to a position opposite the one of the walls 187 engaged by the rollers 186 for seating the valve 171 with pressure when in the position in which the parts are shown in the drawing and for seating the valve 172 when the rollers 186 engage the other wall 187.

The brake cylinder device 3 is of the load compensating type and may be like that shown in the pending application of Mortimer B. Cameron and Fred Temple, Serial No. 141,092, filed January 28, 1950 and assigned to the assignee of the present application. Briefly, the brake cylinder device comprises a casing containing a piston 189 at one side of which is a pressure chamber 190 connected by a pipe 191 to the brake cylinder passage 88 in the valve device 1. Projecting from the opposite side of piston 189 is a hollow rod 192 containing the usual push rod 193 for transmitting braking force from said piston to the brake rigging on a car for pushing brake shoes against car wheels in the well-known manner. A release spring 194 encircling the hollow rod 192 acts on the piston 189 for urging it to its brake release position upon release of fluid under pressure from chamber 190.

A sleeve 195 encircling the spring 194 has an air tight connection at one end with piston 189 and cooperates with a packing ring 196 near its opposite end to provide an annular compensation pressure chamber 197 around the sleeve 195 and connected by a pipe 198 to passage 55 in the brake controlling valve device 1. The space 199 within the sleeve 195 constitutes a non-pressure chamber which is in constant communication with atmosphere as through a breather port 200.

The pressure retaining valve device 4 is connected via pipe 201 to a passage 202 in the valve device 1 which passage leads to the seat of the main service slide valve 27. The retaining valve device 4 may be like that disclosed in Patent No. 2,204,796 issued on June 18, 1940 to C. C. Farmer and operates in the usual way to either permit a direct release of fluid under pressure from the brake cylinder pressure chamber 190, or to limit release of fluid under pressure from said chamber to a chosen low degree, as well-known.

OPERATION

*Initial charging*

Let it be assumed that the brake apparatus is void of fluid under pressure and that the various parts thereof are in the positions in which they are shown in the drawing.

To initially charge the brake apparatus, fluid will be supplied to the brake pipe 2 and be increased in pressure to the degree, such as seventy pounds, usually normally carried in freight service.

As fluid under pressure is thus supplied to the brake pipe 2, it will flow therefrom through passage 22 to chamber 21 encircling the air strainer 20 thence through said strainer to chamber 19. From chamber 19 fluid at brake pipe pressure will flow via passage 18 to the service diaphragm chamber 17 and past check valve 62 and through choke 61 to the load compensating reservoir 60 to charge same with fluid at the pressure in the brake pipe. From chamber 19 fluid under pressure will also flow through passage 36 to the emergency diaphragm chamber 35 and through passage 47 and choke 120 to valve chamber 118 in the compensating control valve device 10 and to chamber 145 in the vent valve device 12.

As fluid under pressure is supplied from the brake pipe 2 to passage 18 and the service diaphragm chamber 17 a portion of such fluid will flow from said passage through a combined charging and quick service choke 203 to a passage 204 having two branches 205 and 206, respectively, leading to the seat of the main service slide 27. With the parts of the service application valve device 7 in their brake release position, in which they are shown in the drawing, ports 207 and 208 in the slide valve 27 register at one end with the branch passages 205, 206, respectively, the other end of port 208 being lapped by the auxiliary slide valve 33, while the other end of port 207 is open past the upper end of the auxiliary slide valve 33 to valve chamber 23 whereby fluid under pressure supplied from the brake pipe through choke 203 will flow to said chamber and thence via passage 24 to the auxiliary reservoir 5 for charging said chamber and reservoir. Fluid under pressure will also flow from valve chamber 23 through a port 209 in the auxiliary slide valve 33, a port 210 in the main slide valve 27 to passage 131 and thence to chamber 130 in the emergency high pressure valve device 11 and to the emergency reservoir 5.

It will be noted that the choke 203 being located between the brake pipe passage 18 and the branch passages 205, 206 (instead of being placed in branch passage 205) provides for pressure of fluid increasing via branch passage 205 in the service slide valve chamber 23, wherein it acts to press the auxiliary slide valve 33 to its seat, at the same rate as it increases via branch passage 206 on the seating face of the auxiliary slide valve 33 thereby preventing obtaining a force on the auxiliary slide valve 33 which could undesirably blow it from its seat.

In the normal or release position of the main service slide valve 27; a cavity 211 therein establishes communication between passage 142 and passage 202 leading to the retaining valve device 4 which, it will be assumed, is in its direct release position, whereby pressure chamber 190 in the brake cylinder device 3 and pressure chamber 86 in the load compensating valve device 9 will both be vented to atmosphere via the brake cylinder passage 88, past the unseated check valve 153 in the quick service limiting and inshot valve device 13 and thence through passages 142 and 202. With chamber 166 in the quick service limiting and inshot valve device 13 thus vented, spring 170 will deflect diaphragm 167 to open the valves 153 and 158.

It will also be assumed that the valve 172 is open and valve 171 closed in the brake cylinder release valve device 14.

With chamber 86 in the load compensating valve device 9 vented, as just mentioned, the follower 79 will assume the position in which it is shown in the drawing, permitting closure of the supply valve 65 by spring 66. The follower 71 may be just engaged by the release valve 69 with chamber 54 and thereby the connected compensating chamber 197 in the brake cylinder device 3 at substantially atmospheric pressure, otherwise any pressure in chambers 54 and 197 would deflect the diaphragm 53 to open the release valve 69 to permit such to occur.

In the emergency valve device 8, fluid under pressure supplied from the brake pipe 2 to passage 36 will flow through a choke 212 and past a check valve 213 to valve chamber 37 and the quick action chamber 38 to charge same to normal brake pipe pressure. If, at the head end of a train where the pressure of fluid in brake pipe 2 may become increased temporarily to a degree higher than that which it is desired to normally carry, the valve chamber 37 and quick action chamber 38 will tend to become overcharged but such overcharge will be prevented by flow of fluid under pressure from said chamber past a check valve 214 to chamber 46 and thence through passage 24 to the auxiliary reservoir 5 which is of such volume as to absorb such fluid under pressure from chambers 37 and 38 while the pressure in the brake pipe temporarily exceeds the normal degree. Thus when the brake apparatus becomes fully charged the pressure in chambers 37 and 38 will be substantially the same as brake pipe pressure in chamber 35 acting on the opposite side of the emergency diaphragm 34.

At the same time as fluid under pressure is supplied to the auxiliary and emergency reservoirs 5, 6, respectively, via the service application valve device 7, as above described, fluid under pressure from the brake pipe 2 supplied to valve chamber 118 in the compensating control valve device 10 via passage 119 will flow through a port 215 in slide valve 117 to a passage 216 and thence past a check valve 217 to passage 24 and the auxiliary reservoir 5 and at the same time past a check valve 218 to passage 131 and the emergency reservoir 6 for accelerating the charging of said reservoirs over that provided by choke 203 in initially charging of the brake apparatus. The accelerated charging, it will be noted, occurs via the compensating control valve device 10 and is effective only during initial charging of the brake apparatus, or to some extent in charging after an emergency application of brakes which will be later described, in order to expedite getting a car or train of cars into condition for movement. After the brake apparatus is once charged, recharging during transit of a car or train of cars is controlled solely by the choke 203, as will be later brought out.

It should also be noted that omission of check valve 48, if desired, would also accelerate the rate of initial charging of the auxiliary reservoir 5, since as soon as brake pipe pressure acting through passage 47 on the seated side of the back dump check valve 45 were increased sufficiently to unseat said check valve against spring 49, fluid under pressure from the brake pipe would then flow past said check valve to the auxiliary reservoir 5. If the check valve 48 should be omitted however, the pressure of spring 49 on the check valve 45 should be such as to insure sufficient increase in brake pipe pressure in the service diaphragm chamber 17 to deflect diaphragm 16 against any opposing pressure of fluid in the auxiliary reservoir, which may be present in valve chamber 23, for moving the slide valves 27, 33 to their brake release position, before said check valve could open.

At the same time as fluid under pressure is supplied from valve chamber 118 in the compensating control valve device 10 to the auxiliary reservoir 5 and emergency reservoir 6, as just described, fluid under pressure from said chamber will also flow through a port 219 in said valve to a passage 220 and thence to a volume reservoir 221 which is open via passage 113 to check valve chamber 112 in the load compensating valve device 9, the check valve 111 being closed at this time so that said reservoir will become charged with fluid under pressure. Fluid under pressure from valve chamber 118 will also flow through a port 222 to passage 128 and thence to diaphragm chamber 127 in the compensating control valve device 10 and also to diaphragm chamber 108 in the load compensating valve device 9. When sufficient pressure of fluid, such as forty pounds, is thus obtained in chamber 108 acting on diaphragm 107, said diaphragm will deflect against spring 110 and actuate lever 103 to withdraw plunger 102 from locking engagement with stem 89 followed by operation of the plunger extension 115 to unseat the check valve 111.

Upon release of plunger 102 from the stem 89, a spring 223 in chamber 78 acting on plunger 81 will move said plunger, said stem and the plate 90 on the end of said stem to their lowermost position in contact with ring 82, and in which these parts are shown in the drawing, if not already so positioned, while upon opening of check valve 111, the volume of fluid under pressure present in the reservoir 221 will suddenly become effective through passage 113, past said check valve and through passage 114 in chamber 92 below piston 91.

The fluid under pressure thus supplied to chamber 92 and acting on piston 91 will move said piston upwardly and turn the lever 98 counter-clockwise about fulcrum pin 99 until the left-hand end of said lever engages the unsprung portion 100 of the car truck. As the parts are shown in the drawing, there is slight clearance between piston 91 and plate 90, and when the car is fully loaded, said piston will just contact said plate when movement of said piston is stopped by contact of lever 98 with the unsprung portion 100 of the truck. If the car is empty and the car body therefore supported in its maximum elevated position, the piston 91 will engage plate 90 and displace same upwardly until the lever 98 engages the truck portion 100, while for any degree of partial load the piston 91 will displace the plate 90 upwardly to a lesser extent, corresponding to the degree of load. Hence, the plunger 81 and connected portion of diaphragm 85 will be adjusted relative to the casing according to the loaded condition of the car and the area of contact of the closed end of said diaphragm against the follower 79 will be correspondingly adjusted. In other words, for a fully loaded car the diaphragm 85 will have a minimum area of contact with follower 79, for an empty car a maximum area of contact, and for any partial load a proportionate area of contact less than maximum and greater than minimum.

While the apparatus is charging with fluid under pressure and the diaphragm 85 is being adjusted relative to the following 79 as above described, the pressure of fluid in the brake pipe 2, and in valve chamber 118 and diaphragm chamber 127 of the compensating control valve device 10 will continue to increase, the pressure in chamber 118 tending to deflect diaphragm 122 and move slide valve 117 toward the left-hand against spring 125 which however is prevented by pressure in chamber 127 deflecting diaphragm 126 against said spring increasing the pressure thereof on diaphragm 122 to hold the latter diaphragm against movement by pressure of fluid in chamber 118. Deflection of diaphragm 126 by increasing pressure of fluid in chamber 127 will finally be stopped by engagement of a follower 224, interposed between said diaphragm and spring 25, and a stop shoulder 225 in the casing, after which further increase in pressure of fluid 118 will deflect diaphragm 122 against spring 125 and move the slide valve 117 toward the left hand until stopped by engagement between a follower 226, interposed between diaphragm 122 and the adjacent end of spring 125, and a casing shoulder 227. The slide valve 117 will thus assume its left hand or cut-out position when the pressure of fluid in the brake pipe 2 is increased to a degree such for example as fifty pounds, the time required to obtain such pressure being adequate to ensure that the diaphragm 85 will be properly adjusted relative to follower 79.

When the slide valve 117 of the compensating control valve device 10 obtains its left-hand or cut-out position, as just described, the passage 216 will be lapped by the slide valve to terminate the fast charging of the auxiliary reservoir 5 and emergency reservoir 6 via said passage; passage 128 will be disconnected from the slide valve port 222 and quickly vented via a port 228 in said slide valve and an atmospheric passage 229, and passage 220 will be disconnected from port 219 and along with passage 114 will be opened to a port 230 and thence through a choke 231 to port 228 and atmosphere via the atmospheric passage 229.

This venting of passage 128 will promptly relieve the locking diaphragm 107 of pressure of fluid in chamber 108 whereupon spring 110 will actuate lever 103 to move plunger 102 into locking engagement with stem 89 which at this time is being held by pressure of fluid in chamber 92 acting on piston 91 in a position corresponding to the loaded condition of the cars. The movement of plunger 102 into locking engagement with stem 102 also permits closing of check valve 111 by spring 116. The venting of passage 114 and at the same time of passage 220 and the volume reservoir 221 via choke 231 permits the pressure of fluid in the strut piston chamber 92 to gradually reduce to atmosphere, the choke 231 being provided to so limit the rate of reduction in such pressure that the piston 91 will positively remain in the position holding lever 98 against the unsprung portion 100 of the car truck to thereby hold the diaphragm 85 properly adjusted relative to follower 79 according to the loaded condition of the car until after the locking plunger 102 has been moved into locking engagement with stem 89 to maintain such adjustment upon complete release of fluid under pressure from the strut piston chamber 92 which will occur via the communication including choke 231. When the pressure of fluid in the strut piston chamber 92 thus becomes reduced to a chosen low pressure, spring 96 will move the piston 91 downward away from plate 90, which will be held against movement by the locking plunger 102, until shoulder 97 engages the casing, this movement rocking lever 98 out of contact with the unsprung portion 100 of the car truck. The piston 91 and lever 98 will then remain in this position during subsequent control of brakes on the car or until charging of the brake apparatus is effected following complete venting of fluid under pressure from the brake pipe 2.

The venting of diaphragm chamber 127 in the compensating control valve device 10 upon movement of the slide valve 117 to its left-hand position permits spring 125 to extend and return the diaphragm 126 to the position in which it is shown in the drawing. This reduces the pressure of spring 125 on the diaphragm 122 to such a degree that the slide valve 117 will remain in its left-hand position until brake pipe pressure in chamber 118 acting on said diaphragm becomes subsequently reduced to some chosen degree, such as twenty pounds, before spring 125 can return said slide valve to normal position. Therefore, after the diaphragm 85 has been adjusted according to the loaded condition of a car and the slide valve 117 has assumed its left-hand or cut-off position, such adjustment and position will remain during subsequent service and emergency control of brakes on a car, but upon recharging of the brake pipe after complete venting of the brake pipe 2, a readjustment of diaphragm 85 will occur by operation of the compensating control valve device 10, in the same manner as above described.

After the rapid charging of the auxiliary reservoir 5 and emergency reservoir 6 is terminated via passage 216 as above described, the rapid charging of the auxiliary reservoir 5 may continue, in case of omission of check valve 48, past the back dump check 45 in the emergency application valve device 8 until the pressure in the auxiliary reservoir is to within a chosen degree, such as ten pounds, of pressure of fluid in brake pipe 2, whereupon spring 49 will close the check valve 45 to prevent further charging via this path. When this occurs, as well as in case the check valve 48 is not removed, charging of the apparatus to normal brake pipe pressure after movement of the compensating control slide valve 117 to its left-hand or cut-out position will be limited to the capacity of choke 203 in the service application valve device 7 plus whatever fluid under pressure may be obtained from the emergency valve chamber 37 past the overcharge dissipating check valve 214 to prevent overcharging thereof.

It will be noted that accelerated charging via passage 47 and past the back dump check valve 45 with the check valve 48 removed is dependent upon brake pipe pressure in said passage exceeding auxiliary reservoir pressure acting in chamber 46 by a chosen degree sufficient to open the back dump check valve 45 against spring 45. As previously mentioned, this chosen degree is such as to ensure obtaining sufficient differential between the pressures in the brake pipe 2 and auxiliary reservoir 5 acting on opposite sides of diaphragm 16 in the service application valve device 7 to deflect said diaphragm to move the slide valves 27, 33 to their brake release position. After the service application valve device thus obtains its release position, the opening of the charging communication through choke 203 may, particularly toward the end of a long train, prevent obtaining the differential between brake pipe and auxiliary reservoir pressures required to open the back dump check valve 45 but toward the front of the train where such differential will be obtained, the opening of said check valve will accelerate charging as above described. This quick charging via the back dump check valve 45 will be effective and particularly desirable however when one or more uncharged cars are coupled to a charged train in that it will permit charging of the brake apparatus on such car or cars in a minimum of time to expedite movement of the train.

With diaphragm 35 and slide valve 39 of the emergency application valve device 8 in their normal position, passage 143 and a passage 232 are both lapped by said valve. Passage 143 and the connected chambers 139 and 150 in the emergency high pressure valve device 11 and brake pipe vent valve device 12, respectively, are vented through port 152 in the diaphragm stem 148, chamber 146 and casing passage 147 through which latter chamber and passage the passage 232 is also vented. With chamber 139 in the emergency high pressure valve device 11 vented, spring 133 will seat the valve 129 to permit the emergency reservoir 6 to become fully charged to pressure in the brake pipe 2, while with chamber 150 in the brake pipe vent valve device 12 vented, spring 151 will seat the brake pipe vent valve 144 to permit the charging the brake pipe above described.

With the brake apparatus fully charged with fluid at the normal pressure carried in the brake pipe 2, it will now be seen that all parts of the brake controlling valve device 1 will assume the position in which they are shown in the drawing except the slide valve 117 and diaphragm 122 of the compensating control valve device 10 which will be in their left-hand or cut-out position. The diaphragm 85 will be adjusted to the follower 79 according to the loaded condition of the car, and pressure chambers 190, 197 in the brake cylinder device 3 will both be vented permitting spring 194 to hold the brake cylinder piston 189 in its brake release position in which it is shown in the drawing.

Service application of brakes

If it is now desired to effect a service application of brakes, the pressure in the brake pipe 2 will be gradually reduced at the usual service rate. The choke 203 will restrict back flow of fluid under pressure from the auxiliary reservoir 5 to the brake pipe 2 to such an extent that the brake pipe pressure in diaphragm chamber 17 of the service application valve device 7 will promptly reduce below auxiliary reservoir pressure on the opposite side of diaphragm 16 sufficiently, such as one-half pound, to produce a force on said diaphragm which will shift it and the auxiliary slide valve 33 upwardly relative to the main slide valve 27 in order to lap port 207 to cut-off back flow of fluid under pressure from the auxiliary reservoir 5 and valve chamber 23 to the brake pipe 2, and to lap port 210 for disconnecting the auxiliary reservoir 5 from the emergency reservoir 6. When the ports 207 and 210 are thus lapped, plunger 30 in the end the stem 25 will engage the lower end of the main slide valve 27, which is pressed to its seat by auxiliary reservoir pressure in valve chamber 23 and therefore offers a considerable resistance to movement. Upon a slight further reduction in brake pipe pressure relative to that in the auxiliary reservoir, such as another half-pound, a sufficient differential in pressure will be obtained on diaphragm 16 to overcome the opposing force of spring 31 on plunger 30 whereupon the diaphragm 16 will continue deflection upwardly and move the auxiliary slide valve 33 on the main slide valve 27 to an initial quick service position defined by shoulder 29 in the piston stem 25 engaging the lower end of the main slide valve.

In the initial quick service position of the auxiliary slide valve 33 relative to the main slide valve 27, a service port 233 in the latter valve will be opened to valve chamber 23 while a cavity 234 in the auxiliary slide valve will connect port 208 and passage 206 from the brake pipe to a port 235 in the main slide valve. The port 235 is open to a passage 236 and leads to a quick service reservoir 237 which is constantly open to atmosphere through a vent including a choke 238. With the ports 208 and 235 thus connected, fluid under pressure will flow from the brake pipe to the quick service reservoir 237 at a quick service rate controlled by choke 203 and thence to atmosphere through the choke 238.

The capacity of choke 203 is such as to permit an initial fast local reduction in brake pipe pressure limited to substantial equalization into the quick service reservoir 237 following which brake pipe pressure will continue to reduce at a slower rate controlled by choke 238. This fast initial local but limited reduction in brake pipe pressure is for hastening operation of the brake controlling valve device on the next car of a train. The brake controlling valve device on the next car operates in a similar manner, and in this manner, quick serial response of the brake controlling valve devices in a train to a reduction in brake pipe pressure initiated at the locomotive is obtained.

After this sudden local, quick service reduction in brake pipe pressure has been effected by the flow of fluid under pressure to the quick service reservoir 237, the quick service reduction in brake pipe pressure continues at a slower rate through choke 238 for the purpose of insuring obtaining a sufficient reduction in brake pipe pressure below auxiliary reservoir pressure acting on opposite sides of the local diaphragm 16 to cause said diaphragm to move the main slide valve 27 toward a service position adapted to be defined by engagement with the casing of the end of the portion of stem 25 disposed in chamber 17. As the main slide valve 27 is thus moved, port 208 in the said valve is moved out of registry with the brake pipe passage 206 to terminate quick service venting of fluid under pressure from the brake pipe to the quick service reservoir 237 and at substantially the same time the service port 233 is cracked open to passage 142 to permit fluid under pressure to flow from valve chamber 23 and the auxiliary reservoir 5 past the end of the auxiliary slide valve 33 to said port and thence through passage 142, past the open valve 153 in the combined quick service limiting and inshot valve device 13 to passage 88 and thence through pipe 191 to pressure chamber 190 in the brake cylinder device 3. Immediately after cracking open passage 142 to the service port 233, a cavity 239 in the main slide valve cracks open the brake pipe passage 206 to passage 160 and finally in service position in which the service port 233 is fully open to passage 142 the brake pipe passage will be fully open via cavity 239 to passage 160 whereby at the same time as fluid under pressure is supplied from the auxiliary reservoir 5 to the brake cylinder device 3 via service port 233, a final quick service venting of fluid under pressure from the brake pipe 2 will occur via cavity 239 in said slide valve to passage 160 and thence past check valve 244 and the open quick service modifying check valve 158 to chamber 154 and through passage 88 to the brake cylinder device. It will be noted here that the check valve 244 is to prevent back flow to brake pipe 2 of fluid under pressure from the brake cylinder pressure chamber 190 past check valve 158 when the brake pipe is completely vented in effecting an emergency application of brakes, which will hereinafter be described.

It will be noted that as fluid under pressure is supplied via passage 142 to chamber 190 in the brake cylinder device 3 as just described, fluid under pressure from said passage will become effective in chamber 166 at one side of diaphragm 167 the opposite side of which is subject to atmospheric pressure plus the pressure of spring 170 in chamber 168. When a certain pressure, such as ten pounds, has thus been developed in the brake cylinder pressure chamber 190, the pressure of fluid obtaining in chamber 166 of the valve device 13 at that time will overcome the opposing pressure of spring 170 on diaphragm 167 and deflect said diaphragm against said spring to permit closing of the quick service modifying check valve 158 and also of the check valve 153. Seating of the check valve 158 will prevent further quick service venting of fluid under pressure from the brake pipe to the brake cylinder chamber 190, it being noted that such quick service venting will insure a chosen minimum pressure in said chamber and, in the case of a train, in the same chamber on all other cars of the train.

After the quick service modifying valve 158 closes to prevent further local quick service venting of fluid under pressure from the brake pipe 2, fluid under pressure will continue to be supplied from the auxiliary reservoir 5 to the brake cylinder pressure chamber 190 via the service port 233 and choke 176 until the auxiliary reservoir pressure in the valve chamber 23 is reduced slightly below that in the brake pipe 2 whereupon the diaphragm 16 will deflect toward the lower pressure and move the auxiliary slide valve 33 relative to the main slide valve 27 until the shoulder 28 on stem 25 engages the main slide valve. This engagement will prevent further downward movement of the diaphragm 16 and auxiliary slide valve 33 at this time and defines what is commonly known as a service lap position in which the auxiliary slide valve 33 laps the service port 233 to thereby prevent further flow of fluid under pressure from the auxiliary reservoir to the brake cylinder pressure chamber 190 and thereby limit the pressure of fluid obtained therein in accordance with the reduction in brake pipe pressure.

If a further service reduction in pressure is effected in the brake pipe 2, the diaphragm 16 will move the auxiliary slide valve first to service position and then back to lap position to provide a corresponding increase in pressure in the brake cylinder pressure chamber 190, as will be apparent from the above description, it being noted that with the quick service modifying check valve 158 closed at this time, there will be no quick service venting of fluid under pressure from the brake pipe upon a reduction in brake pipe pressure effected to increase the degree of a brake application.

The choke 176 does not materially restrict flow of fluid under pressure to the brake cylinder pressure chamber 190 from the auxiliary reservoir 5 in effecting a service application of brakes, but is effective to limit flow in effecting an emergency application of brakes, as will hereinafter be described. In effecting a service application of brakes, the rate of supply of fluid under pressure to the brake cylinder device is controlled by the service rate of reduction in pressure in brake pipe 2 and the flow capacity of the service port 233 in the main slide valve 27.

When fluid under pressure is supplied via passage 88 to the brake cylinder pressure chamber 190 by operation of the service application valve device 7 as just described, fluid under pressure from said passage will equalize through the slip joint connection 87 into chamber 86 at the lower side of diaphragm 85 in the load compensating valve device 9 and therein act on said diaphragm to exert an upward force on the follower 79. If the car is fully loaded and, as a result, the follower 79 and diaphragm 85 are in the position in which they are shown in the drawing, the area of contact between said diaphragm and follower will be such that the force exerted by the diaphragm against the follower, due to pressure of fluid in chamber 86, initially will be counterbalanced by pressure of spring 66 and of fluid in chamber 59 pressing the supply valve 65 to its seat. The fluid under pressure supplied to chamber 190 in the brake cylinder device 3, as above described, will move the piston 189 therein toward the right hand to apply the brakes on the car and during this movement tend to compress fluid in the compensating chamber 197. Upon a slight increase in pressure in chamber 197 and consequently in diaphragm chamber 54, the diaphragm 53 will however deflect against diaphragm 85 to open the release valve 69 to dissipate air from the brake cylinder compensating chamber 197 whereby the pressure in said chamber will remain at substantially atmospheric pressure. The brakes on the loaded car will therefore be applied with a force governed by the pressure of fluid in chamber 190 acting on the brake cylinder piston 189.

If the car is only partially loaded at the time the brakes are applied, the plunger 81 will be positioned upward from the full load position in which it is shown in the drawing in a position corresponding to the partial load, and the area of contact between diaphragm 85 and follower 79 will be corresponding increased. As a result, when fluid under pressure is supplied to the brake cylinder chamber 190 to apply the brakes on the car, such pressure being effective in chamber 86 will create a force on follower 79 which will actuate same to unseat the supply valve 65. Fluid under pressure from the load compensating reservoir 60 will then flow past valve 65 to chamber 54 and thence through pipe 198 to the brake cylinder compensating chamber 197. Fluid under pressure will thus be supplied to chambers 54 and 197 until such pressure acting on diaphragm 53 is increased to a degree to slightly overbalance the force created by pressure of fluid in chamber 86 acting on the load adjusted effective area of diaphragm 85 whereupon diaphragm 53 will deflect downward to permit closing of valve 65 by spring 66 thereby limiting the pressure obtained in the brake cylinder compensating chamber 197 in accordance with the load adjustment of diaphragm 85 relative to follower 79 by plunger 81. The pressure of fluid thus obtained in chamber 197 opposes pressure of fluid in chamber 190 acting on the opposite side of piston 189 and thereby limits, in accordance with the differential in opposing forces acting on said piston, the force provided on push rod 193 to apply the brakes.

Since the effective area of diaphragm 85 is adjustable according to the degree of load on the car, the pressure of fluid obtained in the compensating chamber 197 upon effecting an application of brakes will be varied inversely in proportion to the degree of load to thereby provide a braking force on the push rod 193 in direct proportion to the degree of load.

If the car is empty, the adjusted effective area of diaphragm 85 will equal substantially that of diaphragm 53 so that substantially the same pressure will be obtained in the compensating chamber 197 of the brake cylinder device 3 as obtained in chamber 190. The braking force thereby provided on push rod 193 in effecting an application of brakes will therefore be of a minimum value corresponding to the empty condition of the car.

When a service reduction in pressure is effected in brake pipe 2, the pressure in the emergency diaphragm chamber 35 will correspondingly reduce and when thus reduced slightly below that in valve chamber 37 and quick action chamber 38, the diaphragm 34 will deflect in the direction of the lower pressure and move the slide valve 39 to a position in which a port 240 therein registers with the atmospheric passage 232 sufficiently to permit pressure of fluid in valve chamber 37 and quick action chamber 38 to reduce as fast as the brake pipe pressure in chamber 35 is being reduced. Movement of the diaphragm 34 and slide valve 39 will then cease until, after the termination of reduction in pressure in brake pipe 2, the pressure in valve chamber 37 and quick action chamber 38 have reduced slightly below brake pipe pressure in chamber 35 whereupon said diaphragm will deflect in the direction of the lower pressure and return the slide valve 39 to normal position in which it is shown in the drawing.

*Release of brakes after a service application*

In order to release the brakes on a car after a service application, the pressure of fluid in brake pipe 2 will be restored in the usual manner. When the brake pipe pressure in chamber 17 of the service application valve device 7 is thus increased sufficiently over auxiliary reservoir pressure in chamber 23, the diaphragm will flex downward and move the slide valves 33, 27 from service lap position to release position in which they are shown in the drawing. With ports 209 and 210 in the auxiliary and main slide valves 33, 27, respectively, now in registry and reopened to the emergency reservoir passage 131 in release position, fluid under pressure from the emergency reservoir 6 will flow to valve chamber 23 and the auxiliary reservoir 5 to promptly restore the pressure therein to substantial equalization of pressures in the two reservoirs, following which, the pressure of fluid in both of said reservoirs will be restored to normal as the brake pipe pressure is restored by supply of fluid under pressure from the brake pipe through choke 203, passages 204, 205 and port 207 in the main slide valve 27.

When the main slide valve 27 is returned to release position as just mentioned, cavity 211 therein will reconnect passage 142 to the retaining valve device 4 via passage 202 and pipe 201 whereby fluid under pressure will be released from chamber 154 in the combined quick service modifying and emergency inshot valve device 13. Upon such venting of fluid under pressure from chamber 154, fluid under pressure will be released from the pressure chamber 190 in the brake cylinder device 3 and from diaphragm chamber 86 in the load compensating valve device 9 via the unseated valve 172 in the emergency delay and brake cylinder release valve device 14, passage 174 and choke 176. When the fluid under pressure in diaphragm chamber 86 is released as just mentioned, the opposing pressure of fluid in chamber 54 acting on diaphragm 53 will deflect same downward to unseat the release valve 69 whereupon fluid under pressure will be released from chamber 54 and the compensating chamber 197 in the brake cylinder device 3. In this manner, fluid under pressure will be released from chamber 197 at substantially the same time as from chamber 190 and the load compensating valve device 9 will continue such release with complete release of fluid under pressure from chamber 190 until the pressure in chamber 197 is reduced to substantially atmospheric pressure whereupon the diaphragm 53 may deflect upward sufficiently to close the release valve 69.

Upon the release of fluid under pressure from the brake cylinder pressure chamber 190, the return spring 194 will return the piston 189 to its release position to cause release of brakes on the car.

In the valve device 13, the pressure of fluid in chamber 166 will reduce along with brake cylinder pressure through passage 142 and when sufficiently reduced, spring 170 will return the parts of said valve device to normal position in which they are shown in the drawing.

In releasing the brakes after a service application, fluid at brake pipe pressure will also flow through choke 212 and past the check valve 213 to the emergency valve chamber 37 and quick action chamber 38 to recharge said chambers to normal brake pipe pressure.

In the above description of releasing brakes after a service application, it was assumed that the retaining valve device 4 was turned down to permit complete release of brakes. If the retaining valve device should be turned up to retain a certain pressure in the brake cylinder device, as while cycling down a grade, then upon restoring of brake pipe pressure to recharge the brake apparatus, the pressure of fluid in the brake cylinder chamber 190 of the brake cylinder device will reduce through the retaining valve device 4 and the pressure in the brake cylinder chamber 197 will correspondingly reduce in the same manner as above described down to the pressure which the retaining valve device is adjusted to hold in pressure chamber 190 whereupon further release of fluid under pressure from chamber 190 and thereby from chamber 197 will cease. The pressure thus retained in the brake cylinder pressure chambers 190 and 197 to hold brakes applied being effective in chamber 166 of the combined quick service modifying and emergency inshot valve device 13 will hold the diaphragm 167 deflected against spring 170 so that the quick service modifying check valve 158 will remain seated. Thus when a subsequent application of brakes is effected with the retaining valve device 4 turned up, quick service action by venting of fluid under pressure from the brake pipe to the quick service reservoir 237 and thence to atmosphere through choke 238 will occur the same as upon initiating an application, as above described, in order to ensure prompt propagation of the reduction in brake pipe pressure through the train and then to insure that the service brake application valve device 7 moves to service position, but with the quick service modifying check valve 158 seated there will be no quick service venting of fluid under pressure from the brake pipe to the brake cylinder pressure chamber 190 as occurred upon the initial reduction in brake pipe pressure.

Emergency application of brakes

If it is desired to effect an emergency application of brakes, a sudden emergency reduction in pressure in brake pipe 2 will be initiated in the usual manner. In response to such reduction in brake pipe pressure, the service application valve device 7 will move to service position for supplying fluid under pressure from the auxiliary reservoir 5 to the brake cylinder pressure chamber 190 the same as is effected by a service application of brakes. Also the service application valve device in its traverse to service position will establish the quick service brake pipe venting communication above described in connection with effecting a service application of brakes, and while some fluid under pressure may be vented from the brake pipe through said communications such venting is immaterial and not necessary due to emergency venting of the brake pipe by operation of the emergency application valve device 8, as will now be described.

Upon an emergency reduction in pressure in brake pipe 2 and hence in diaphragm chamber 35 of the emergency valve device 8, a differential will promptly be established between the pressures of fluid acting on opposite sides of diaphragm 34 which will deflect said diaphragm and move the slide valve 39 upwardly. In service position of the slide valve 39 port 240 will register with passage 232 to permit venting of fluid under pressure from the valve chamber 37 and quick action chamber 38, the same as in effecting a service application of brakes. A choke 241 in the passage 232 limits such venting to a service rate however so that the emergency rate of reduction in brake pipe pressure in chamber 35 will so exceed the rate of reduction in pressure in valve chamber 37 that a sufficient differential of pressures will be maintained on the diaphragm 34 to continue movement thereof and of the slide valve 39 to an emergency position, defined by engagement with the casing of the portion of stem 40 disposed in the brake pipe chamber 35, and in which the lower end of slide valve 39 uncovers the passage 143. Fluid under pressure from valve chamber 37 and quick action chamber 38 will then flow to passage 143 and thence to diaphragm chamber 139 of the emergency high pressure valve device 11 and to diaphragm chamber 150 of the brake pipe vent valve device 12.

Fluid under pressure thus provided in chamber 150 will promptly deflect diaphragm 149 to unseat the vent valve 144 whereupon, by way of passages 22, 36 and 47, a sudden emergency venting of fluid under pressure from the brake pipe 2 will occur to transmit the emergency reduction in brake pipe pressure to the brake controlling valve device on the next car to the rear in a train and hence serially from car to car throughout the length of the train, in the usual manner.

The fluid under pressure provided in diaphragm chamber 139 of the emergency high pressure valve device 11 will deflect diaphragm 138 to unseat the check valve 129 whereupon fluid under pressure will flow from the emergency reservoir 6 to passage 142 which at the same time is being supplied with fluid under pressure from the auxiliary reservoir 5 via service application valve device 7.

The fluid under pressure thus supplied to passage 142 from the auxiliary reservoir 5 and emergency reservoir 6 will rapidly flow past the unseated inshot valve 153 in the combined modifying and inshot valve device 13 to passage 88 and thence to the brake cylinder pressure chamber 190 to initiate an emergency application of brakes until the pressure in chamber 166 of said device is increased to a degree sufficient to deflect diaphragm 167 against spring 170. The emergency inshot valve 153 will then close so that all further supply of fluid under pressure to the brake cylinder pressure chamber 190 up to equalization of the pressures in the auxiliary reservoir 5 and emergency reservoir 6 will be limited to the flow capacity of choke 176, it being understood that the load compensating valve device 9 will operate in the same manner as hereinbefore described in connection with effecting a service application of brakes to provide fluid in the brake cylinder compensating chamber 197 to limit the degree of brake application according to the load condition of the car.

The initial rapid inshot of fluid under pressure to the brake cylinder pressure chamber past the inshot valve 153, of for example ten pounds, is for the purpose of providing quickly a sufficient application of brakes on cars of a train to cause a gentle gathering of slack between the cars. The capacity of choke 176 is such as to then permit the emergency brake application to increase at such a rate as to maintain the required differential between the braking forces applied to the cars at the front and rear of the train to continue the slack gathering to completion, at which time, a full emergency application will have been obtained on cars at the front of the train and will occur serially to the rear of the train to bring the train to a stop in the shortest possible time without damage to the cars and lading.

The fluid under pressure supplied from the emergency valve chamber 37 and quick action chamber 38 to diaphragm chambers 139 and 150 for operating the emergency high pressure valve device 11, and brake pipe vent valve device 12 is gradually dissipated through choke 152 to atmosphere, the capacity of said choke being such that the check valve 129 will remain open for a sufficient period of time to ensure full equalization of the pressure of fluid in the emergency reservoir 6 into the auxiliary reservoir 5 and brake cylinder pressure chamber 190, while the vent valve 144 will remain open long enough to ensure complete venting of fluid under pressure from the brake pipe 2 and thereby an emergency application of brakes on all cars of the train. At the expiration of this time period, spring 133 will seat the high pressure check valve 129 and spring 151 will seat the vent valve 144 so that the brake pipe may be recharged whenever desired to cause release of the emergency application of brakes. However, after seating of the vent valve 144, venting of fluid under pressure from the emergency valve chamber 37 and quick action chamber 38 will continue through choke 152 until the pressure in said chambers is reduced to atmospheric pressure to facilitate a release of brakes after an emergency application.

Upon complete venting of fluid under pressure from the brake pipe 2 to effect an emergency application of brakes, the fluid under pressure will be dissipated from valve chamber 118 in the compensating control valve device 10 via passage 47 and spring 125 will expand and return the slide valve 117 to the position in which it is shown in the drawing. This will be immaterial however since all passages opening at the seating face of the slide valve 117 will have been vented upon termination of the car load adjustment of plunger 81 upon initial charging of the train, except passage 216, and the check valves 217, 218 hold fluid pressure in the auxiliary reservoir 5 and emergency reservoir 6 against back flow to said passage.

*Release of brakes after an emergency application*

To effect release of the brakes after an emergency application, fluid under pressure is supplied to the brake pipe 2 and flows to diaphragm chamber 17 in the service application valve device 7 and to diaphragm chamber 35 in the emergency application valve device 8. Fluid in valve chamber 23 of the service application valve device 7 being at reduced auxiliary reservoir pressure at this time, the parts of said device will remain in service position until the opposing brake pipe pressure on diaphragm 16 is increased slightly over the pressure in valve chamber 23.

As fluid under pressure is thus supplied from the brake pipe 2 to the emergency diaphragm chamber 35, fluid will also flow through choke 212 to the valve chamber 37 and quick action chamber 38 both of which were completely vented in effecting an emergency application of brakes. The flow capacity of choke 212 is so small however with respect to the relatively rapid rate of increase in brake pipe pressure in diaphragm chamber 35 that a sufficient differential of pressures will be promptly obtained on diaphragm 34 to deflect said diaphragm and move the slide valve 39 and stem 40 downward until the stem contacts the plunger 42 and then moves said plunger against spring 44 into contact with the casing defining a back dump position. During this movement to back dump position, the plunger 51 will be operated to unseat the back dump valve 45 which may occur at a time when the brake pipe pressure has been increased above atmospheric pressure, only for example about six pounds and at which time the pressure in the auxiliary reservoir 5 and brake cylinder pressure chamber 190 may be around 65 pounds, said reservoir being still open to said chamber with the parts of the service brake application valve device 7 in service position. As a result, the instant the back dump valve 45 is opened, a rapid flow of fluid under pressure from the auxiliary reservoir 5 and the brake cylinder pressure chamber 190 will occur past said valve and thence past check valve 48 and through passages 47, 36 and 22 to the brake pipe 2. This will cause a rapid local increase in pressure in the brake pipe to substantial equalization of the pressures in the auxiliary reservoir 5 and brake cylinder pressure chamber 190 into the brake pipe at perhaps forty pounds. This back dumping operation will naturally occur first on the first car of a train where the increase in brake pipe pressure is initiated by the engineer's automatic brake valve device on the locomotive, and the rapid local increase in brake pipe pressure thus effected will cause back dump operation of the brake controlling valve device on the next car to the rear in the train and so travel serially from car to car through the train. This back dumping of fluid under pressure to the brake pipe from the brake cylinder pressure chamber 190 saves fluid which would otherwise be merely vented to atmosphere to effect a release of brakes and thereby lost; it hastens charging of the system and release of brakes after an emergency application and it also reduces the pressure in the auxiliary reservoir 5 to a relatively low degree where the rate of increase in brake pipe pressure subsequent to back dump will be faster than at a higher pressure and facilitate obtaining the necessary differential on the diaphragm 16 of the service brake application valve device 7 to move the parts thereof to their brake release position.

After termination of the back dump operation, the continued supply of fluid under pressure to the brake pipe 2 will continue to increase the pressure of fluid in diaphragm chambers 17 and 35. When the pressure in chamber 17 is thus increased sufficiently over the reduced auxiliary reservoir pressure in chamber 33, the diaphragm 16 will return the slide valves 27, 33 to release position in which the auxiliary reservoir 5 will be disconnected from the brake cylinder pressure chamber 190 and said chamber will be vented to atmosphere via passage 202 to effect a release of brakes the same as before described. Also, the emergency reservoir 6 will be opened through passage 131, port 210 in the main slide valve 27 and past the upper end of the auxiliary slide valve 33 to valve chamber 23 and thereby the auxiliary reservoir to permit recharging of said chamber and reservoir with fluid under pressure from the emergency reservoir to equalization of the pressures of fluid therein. After such equalization occurs, final charging of the auxiliary reservoir 5 and emergency reservoir to normal brake pipe pressure will occur from the brake pipe via choke 203 the same as in initial charging.

In the emergency valve device 8, the valve chamber 37 and quick action chamber 38 become gradually charged with fluid under pressure from the brake pipe via choke 212 and when the pressure in said chambers become sufficiently increased, spring 44 will return the diaphragm 34, stem 40 and slide valve 39 to their normal positions in which said chambers will finally become charged via choke 212 to the normal pressure in brake pipe 2. Upon return of the diaphragm 33 and connected parts to normal position, the back dump valve 49 will be closed by spring 49 to bottle up at this point the fluid under pressure in the auxiliary reservoir 5. If the check valve 48 is dispensed with, as before mentioned, charging of the auxiliary reservoir, particularly at the head of a train will be accelerated, as long as brake pipe pressure acting on the seated side of the back dump valve 45 exceeds the opposing pressure of spring 49, as will be clear from previous description.

Also, since the parts of the compensating control valve device 10 assumed the position in which they are shown in the drawing in effecting an emergency application of brakes, charging of the auxiliary and emergency reservoirs after the back dump operation above described may be accelerated by flow of fluid under pressure from the brake pipe past the check valves 217, 218, respectively, until the parts of said compensating control valve device again move to their cut-out position.

While an emergency application of brakes is in effect, the locking plunger 102 will hold the plunger 81 and diaphragm 85 properly adjusted according to the load on the car, but upon release of such application, the load compensating valve device 9 under the control of the compensating control valve device 11 will again operate the same as before described in connection with initial charging of the brake apparatus, but unless there has been a change in the loaded condition of the car, there will be no change in adjustment of the position of plunger 81. If there has for any reason been a change in the loaded condition of the car, then the plunger 81 and diaphragm 85 will be correspondingly readjusted, as will be clear from previous description.

It will also be clear from previous description that as fluid under pressure is released from chamber 190 in the brake cylinder device 3 for releasing the brakes on a car, the load compensating valve device 9 will operate to correspondingly release fluid under pressure from the chamber 197 whereby both chambers 190 and 197 will be at atmospheric pressure with the car brakes released.

*Operation of emergency delay and brake release valve device 14*

When a car is set out of a train with the brake pipe 2 vented and the brakes applied, it is often desirable to be able to release and reapply the brakes one or more times to check the brake equipment, adjust the brake rigging on the car and at times to renew the brake shoes. On certain railroads a train will be stopped before starting descent of a grade for the same reason. The valve device 14 is provided for operation by a trainman to so release and reapply the brakes on a car.

Normally the valve 172 is open and the valve 171 closed in the valve device 13 and are maintained in this condition by the action of spring 188 on the toggle arms 184. With the brake pipe and thereby chamber 179 vented and the brakes applied on a car, if a trainman desires to release the brakes, he will push the rod 180 and thereby the fulcrum pin 185 past the line of action between the spring 188 and center of rollers 186 whereupon said spring will move said rollers from contact with the left hand wall 187 to contact with the right hand wall 187. During this operation of rod 180, the valve 171 will be unseated and the valve 172 moved toward its seat and finally when the line of action of spring 188 passes to the opposite side of pin 185 said spring will push the valve 172 against its seat with a force greater than that created by pressure in chamber 175 tending to unseat the valve 172.

This seating of valve 172 closes the communication from passage 174 to passage 88 through which fluid under pressure was supplied to the pressure chamber 190 in effecting an application of brakes, the emergency inshot valve 153 being also closed, while the opening of valve 171 vents the brake cylinder pressure chamber 190 and causes operation of the load compensating valve device 9 to vent the brake cylinder chamber 197 whereby the brakes on the car will be released while retaining the fluid under pressure remaining in the auxiliary reservoir 5.

In case it is subsequently desired to reapply the brakes on the car, the trainman may pull the rod 180 to open valve 172 and close valve 171 whereupon fluid under pressure from the auxiliary reservoir 5 will again flow to the brake cylinder pressure chamber 190 to reapply the brakes.

With the brake pipe 2 and diaphragm chamber 179 thus vented, the device 14 may thus be operated to release the brakes and then reapply the brakes a number of times before the pressure of fluid in the auxiliary reservoir 5 will be reduced to a point where an application of brakes can not be obtained, and therefore will provide for any desired inspection and/or adjustment of brake rigging and renewal of shoes if necessary. During such operation the emergency inshot valve 153 will remain seated until the pressure in the auxiliary reservoir 5, which is open through passage 142 to diaphragm chamber 166, becomes reduced sufficiently (slightly less than ten pounds) for spring 170 to deflect the diaphragm 167 against said pressure to unseat said valve and thereby open a by-pass between the auxiliary reservoir 5 and brake cylinder passage 88 around the valve device 14. When this occurs the already greatly reduced pressure in the auxiliary reservoir will equalize into the brake cylinder chamber 190 but the resultant pressure will be insufficient to operate the brake cylinder device 3 to move brake shoes against a car wheel and this is very important since it will avoid the possibility of the brakes being automatically applied at a time when, for example, the trainman is applying new brake shoes. Otherwise the trainman might be injured or lose a hand.

Whenever the brake pipe 2 is subsequently recharged with fluid under pressure, chamber 179 will likewise be recharged. When the brake pipe pressure in chamber 179 acting on diaphragm 178 is thus increased, for example, ten pounds above whatever pressure may be effective in chamber 175, the diaphragm 178 will automatically deflect toward the right hand and return the valves 172, 171 to the position in which they are shown in the drawing, unless already so positioned, to insure subsequent control of brakes by the brake controlling valve device 1.

The retaining valve pipe 201 and passage 202 are open past a check valve 245 to chamber 173 in the release valve device 14, so that when said device is in its brake cylinder venting position said pipe will also be vented. Thus, when the service application valve device 7 is returned to release position and opens passage 142 and chamber 166 to the retaining valve passage 202 at a time when the retaining valve device 4 is turned up to hold pressure in pipe 201 and particularly pressure in excess of ten pounds, such pressure will be vented past the open valve 171 in the release valve device 14 to ensure a sufficient pressure reduction in chamber 166 to render spring 170 effective to reopen the inshot check valve 153 and quick service limiting valve 158. If the retaining pipe were not thus vented, the pressure in chamber 166 might not become reduced sufficiently to permit reopening of the valves 153 and 158 which would be undesirable since it would prevent secondary quick service or emergency inshot upon a subsequent reduction in brake pipe pressure. This venting of the retainer pipe 201 will also result in release of fluid under pressure from diaphragm chamber 175 in the release valve device 14 to facilitate automatic reset thereof by brake pipe pressures in chamber 179, as will be apparent.

As shown in Fig. 2, the chamber 179 may, if desired, be disconnected from the brake pipe 2 and opened to atmosphere via port 242, and a spring 243 may be placed in said chamber to exert a pressure on the diaphragm 178 sufficient to deflect said diaphragm and move the valves 172, 171 to the position in which they are shown in the drawing against, for example, ten pounds pressure of fluid in chamber 175. By this arrangement, whenever the pressure of fluid in chamber 175 is in excess of ten pounds, the diaphragm 178 will be deflected against spring 243 in order to permit release and reapplication of brakes by a trainman operating the rod 180. However, whenever the pressure in chamber 175 is reduced as by supply of fluid under pressure to the brake cylinder pressure chamber 190 by operation of valve 172 or by venting of said chamber by the service application valve device 7 in release position, to slightly below ten pounds, the spring 243 will automatically move the valves 172, 171 to the position in which they are shown in the drawing thereby insuring subsequent control of the brakes by the brake controlling valve device 1. In case the retaining valve device 4 is turned up at the time the service application valve device 7 is returned to its release position, automatic reset of this modified form of release valve device is assured by the provision of the communication including check valve 245, the same as above described in connection with Fig. 1A.

Since, in the structure shown in Fig. 2 of the drawings, diaphragm chamber 179 is always at atmospheric pressure, it will be noted that when a service application of brakes, in excess of ten pounds pressure in the brake cylinder pressure chamber 190 and diaphragm chamber 175, is in effect with the diaphragm 178 therefore deflected against spring 243 and with the brake pipe 2 still charged with fluid under pressure, a trainman may, if desired, release the brakes on the car by pushing the rod 180 to seat the valve 172 and unseat the valve 171, as before described, which can not be accomplished however with the structure shown in Fig. 1A due to brake pipe pressure acting in chamber 179. In case the valve 171 is thus unseated manually for releasing the brakes and then allowed to remain unseated, in the structure shown in Fig. 2, it will be automatically seated and the valve 172 unseated by spring 243 upon subsequent release of fluid under pressure from chamber 175 by return of the service application valve device 7 to release position thereby insuring usual control of brakes on the car.

SUMMARY

It will now be seen that I have provided a relatively simple, highly reliable and relatively low cost brake controlling valve device for use on freight cars and which will automatically vary the degree of braking of such a car according to the lading carried thereby. Flexible diaphragms are employed in the service and emergency application valve devices 7 and 8, respectively, in place of pistons and rings so that flow of fluid from one side to the other of the diaphragms can be accurately controlled as by the chokes 203, 212, respectively, which obviates difficulties with slight uncontrollable and unpredictable piston ring leakage and wear incident to such rings in structures such as at present employed. By eliminating the influence of ring leakage on the control of the brake controlling valve device more positive control of the device may be obtained in response to changes in pressure in the brake pipe, resulting in higher rates of transmission of quick service and emergency reductions in brake pipe pressure through a train, and more prompt and positive increase in brake pipe pressure throughout a train to ensure release of brakes, even after a service application, at the rear end of longer trains than possible with present brake apparatus. Further, the choke 203 providing accurate and the sole control of charging of the auxiliary reservoir 5 will permit use of a smaller auxiliary reservoir than in present brake equipment where piston ring leakage contributes to such charging, since the auxiliary reservoir must be sufficiently large with respect to the relatively slow rate of charging of the brake pipe at a rear end of a long train to permit obtaining a sufficient differential between brake pipe and auxiliary reservoir pressures to move a brake controlling valve device to its brake release position. The use of flexible diaphragms therefore permits use of a minimum size of auxiliary reservoir for a given length of train or with the same size auxiliary reservoir as now employed provides assurance of positive brake release even on longer trains than possible with present brake apparatus. Either result is very desirable, but smaller auxiliary reservoirs will result in lower consumption of compressed air and faster and more uniform charging of a train and release of brakes, while if the size of auxiliary reservoir at present employed were still used, better assurance of release of brakes on trains such as now operated would be obtained.

The improved brake controlling valve device is not so subject to failure from wear or foreign matter which may be present in the air flowing through the device as piston ring type of devices and therefore the time between cleaning periods can be greatly extended. Also less highly skilled mechanics may be employed for maintenance purposes than necessary with present day apparatus.

Having now described my invention, what I claim as new and desire to secure by Letters Patent, is:

1. In a fluid pressure brake apparatus, in combination, a brake pipe, a reservoir, a brake controlling valve device comprising a main slide valve, an auxiliary slide valve slidable on said main slide valve and a movable abutment subject on one side to pressure of fluid in a chamber and on the opposite side to pressure of fluid in said reservoir, a passageway opening said chamber to said brake pipe, said abutment being operative upon an increase in brake pipe pressure to move said slide valves to one position and upon a reduction in brake pipe pressure to move said auxiliary slide valve relative to said main slide valve to a quick service position, another passageway connected to the first named passageway and having two branches open to the seat of said main slide valve, said main slide valve having two ports for registry, respectively, with said branches in said one position, said auxiliary slide valve in said one position lapping one of said ports and opening the other to said reservoir and in said quick service position lapping said other port and establishing a quick service brake pipe venting communication via said one port, and a choke in said passageway between said branches and the first named passageway.

2. In a fluid pressure brake apparatus, in combination, a brake pipe, an auxiliary reservoir, a brake controlling valve device comprising a flexible diaphragm subject on one side to pressure of fluid in a chamber and on the opposite side to pressure in said reservoir, a passageway opening said chamber to said brake pipe and having a branch and valve means operable by said diaphragm upon an increase in brake pipe pressure to a position for establishing a brake releasing communication and also, via said branch, an auxiliary reservoir charging communication and upon a reduction in brake pipe pressure to a quick service position for establishing, via said branch, a quick service brake pipe venting communication, and a combined charging and quick service control choke in said branch.

3. In a fluid pressure brake apparatus, in combination, a brake pipe, an auxiliary reservoir, a brake controlling valve device comprising a flexible diaphragm subject on one side to pressure of fluid in a chamber and on the opposite side to pressure in said reservoir, a first passageway connecting said chamber to said brake pipe, a second passageway connected to said first passageway, and valve means operable by said diaphragm upon an increase in brake pipe pressure in said chamber to a position for establishing a brake releasing communication and for opening said auxiliary reservoir to said second passageway and upon a reduction in brake pipe pressure to a quick service position for establishing a quick service brake pipe venting communication via said second passageway, and movable by said diaphragm to a service position upon a further reduction in brake pipe pressure for establishing another quick service brake pipe venting communication via said second passageway, and a combined reservoir charging and quick service choke in said second passageway.

4. In a fluid pressure brake apparatus, in combination, a brake pipe, a fluid pressure brake reservoir, a communication through which fluid under pressure is adapted to flow from said brake pipe to said reservoir and vice versa, a check valve normally closing said communication against flow of fluid under pressure in the direction from said reservoir to said brake pipe, a spring cooperating with pressure of fluid in said reservoir to seat said check valve against pressure of fluid in said brake pipe and providing for unseating of said check valve by brake pipe pressure upon an increase in brake pipe pressure over pressure in said reservoir sufficient to overcome said spring, an emergency valve device comprising a flexible diaphragm subject to pressure in said brake pipe opposing pressure of fluid in a quick action chamber and operative upon a certain rate of increase in pressure in said brake pipe over that in said chamber to a normal position and upon a faster rate of an increase in pressure in said brake pipe over that in said chamber to an inner position, a choked one-way flow communication for charging said chamber with fluid under pressure from said brake pipe, means effective to oppose movement of said diaphragm from said normal position to said inner position with a chosen force, and means operative by said diaphragm upon movement from said normal position to said inner position to unseat said check valve.

5. In a fluid pressure brake apparatus, in combination, a fluid pressure brake reservoir, a first check valve normally closing a fluid flow communication from said reservoir to said brake pipe, a second check valve for preventing flow of fluid under pressure from said brake pipe through said communication in the direction from said brake pipe to said reservoir, a quick action chamber, a choked charging communication providing for flow of fluid under pressure from said brake pipe to said chamber, an emergency flexible diaphragm subject on one side to pressure in said brake pipe and on the opposite side to pressure of fluid in said chamber, means operative by said diaphragm to a normal position upon a certain rate of increase in pressure in said brake pipe over that in said chamber and to an inner position upon a faster rate of increase in pressure in said brake pipe over that in said chamber, spring means defining said normal position and for opposing movement of said diaphragm operated means to said inner position, and means operated by said diaphragm operated means upon movement to said inner position to open the first named check valve.

6. In a fluid pressure brake apparatus, in combination, a brake pipe, an auxiliary reservoir, and an emergency valve device comprising a quick action chamber, a choked charging communication connecting said brake pipe to said chamber, a check valve for preventing reverse flow of fluid under pressure through said communication from said chamber to said brake pipe, a communication providing for flow of fluid under presure from said chamber to said reservoir, a check valve in the last named communication for preventing flow of fluid under pressure therethrough in the direction from said reservoir to said chamber, a third check valve controlling communication from said reservoir to said brake pipe, a spring normally seating said third check valve, a flexible diaphragm subject on one side to pressure in said chamber and on the opposite side to brake pipe pressure, means operative by said diaphragm upon an emergency reduction in brake pipe pressure to vent fluid under pressure from said chamber to effect an emergency application of brakes and movable to a normal position upon a certain rate of increase in brake pipe pressure and to an inner position upon a faster rate of increase in brake pipe pressure, with respect to increase in pressure of fluid in said chamber, and means operable by said diaphragm operated means upon movement to said inner position to unseat the last named check valve.

7. In a fluid pressure brake apparatus, in combination, a brake pipe, a reservoir from which fluid under pressure is taken for applying brakes on a vehicle, valve means having one position for establishing a fluid pressure supply communication from said brake pipe to said reservoir and another position to close said communication, a spring, a movable abutment connected to said valve means for moving same and subject to pressure of fluid in said brake pipe for urging said valve means to said other position and also subject to opposing pressure of said spring, and another movable abutment of greater area than the first named abutment acting on said spring in opposition to action of said first named abutment and subject to opposing pressure of fluid in a chamber, said valve means including means for opening said chamber to said brake pipe in said one position thereof and to atmosphere in said other position.

8. In a fluid pressure brake apparatus, in combination, a brake pipe, fluid pressure operable brake applying means, a fluid pressure supply reservoir, a brake application valve device controlled by opposing pressure of said brake pipe and reservoir and operable upon a reduction in brake pipe pressure to supply fluid under pressure to said brake applying means to effect an application of brakes, means adjustable according to the load on a car for varying the effect of said fluid under pressure in said brake applying means, a spring, valve means, a movable abutment subject to brake pipe pressure and opposing pressure of said spring and operable by said spring when brake pipe pressure is sufficiently low to actuate said valve means to one position for adjusting said load adjustable means and establishing a fluid pressure supply communication from said brake pipe to said reservoir and operable when brake pipe pressure exceeds the pressure of said spring to actuate said valve means to another position for locking said load adjustable means in an adjusted condition and for closing communication from said brake pipe to said reservoir, another movable abutment of greater area than the first named abutment acting on said spring in opposition to the first named abutment and subject to opposing pressure of fluid in a chamber, said valve means in said one position opening said chamber to said brake pipe and in said other position opening said chamber to atmosphere.

9. In a fluid pressure brake apparatus, in combination, a brake pipe, a fluid pressure supply reservoir, a brake application valve device operable upon a reduction in pressure in said brake pipe to establish a communication for flow of fluid under pressure from said reservoir to effect an application of brakes and operative upon an increase in brake pipe pressure to close said communication and establish a charging communication from said brake pipe to said reservoir which latter communication is closed when the first named communication is opened, valve means having one position for opening a second charging communication for said reservoir from said brake pipe and another position for closing said communication, a movable abutment subject to pressure in said brake pipe, pressure means acting on said abutment with a chosen pressure in opposition to brake pipe pressure and operative when brake pipe pressure is of a relatively low degree to move said valve means to said one position, and means for increasing pressure of said pressure means on said abutment to a chosen higher pressure upon an increase in brake pipe pressure above said low degree to hold said valve means in said one position until brake pipe pressure is increased to a chosen high degree and to then permit movement of said valve means to said other position which reduces pressure of said pressure means in said abutment to said chosen pressure.

10. In a fluid pressure brake apparatus, in combination, a brake pipe, fluid pressure operable brake applying means, a service application valve device operative on both a service and emergency reduction in pressure in said brake pipe, to open a quick service vent from said brake pipe to said brake applying means and to also supply fluid under pressure to a communication for supply to said brake applying means, an emergency valve device operable upon an emergency reduction in brake pipe pressure to also supply fluid under pressure to said communication for supply to said brake cylinder, a normally open check valve in said vent, a normally open check valve past which fluid under pressure may flow from said communication to said brake applying means, a movable abutment subject on one side to pressure of fluid in said communication and on the opposite side to atmospheric pressure, a spring acting on said opposite side of said abutment, said abutment being operative upon a chosen increase in pressure in said communication to effect closure of both of said normally open check valves and a restricted passage opening said communication to said brake applying means in by-passing relation to the second named normally open check valve.

11. In a fluid pressure brake apparatus, in combination, a brake pipe, fluid pressure operable brake applying means, brake controlling means operable upon a reduction in brake pipe pressure to supply fluid under pressure to said brake applying means through two parallel arranged communications of different flow capacities, a valve device operable in response to a chosen pressure of fluid supplied by said brake controlling means to close the one of the two parallel communications of greater flow capacity, valve means controlling the other of the two communications and selectively operative to either close same and open a vent from said brake applying means or close said vent and open said other communication, and means operative manually to actuate said valve means.

12. In a fluid pressure brake apparatus, in combination, a brake pipe, fluid pressure operable brake applying means, brake controlling means operable upon a reduction in brake pipe pressure to supply fluid under pressure to said brake applying means through a single passageway and thence through two parallel arranged communications of different flow capacities and operative upon an increase in brake pipe pressure to vent fluid under pressure from said passageway, a valve device operative in response to an increase in pressure to a chosen degree in said passageway to close communication through the one of said two communications of greater flow capacity and in response to a reduction in pressure in said passageway to a lower degree to open such communication, valve means controlling the other of said two communications and operable to either close same and open a vent from said brake applying means or open same and close said vent, manually operable means for actuating said valve means, and means operable upon charging said brake pipe with fluid under pressure for automatically actuating said valve means to open the said communication of lesser flow capacity and to close said vent.

13. In a fluid pressure brake apparatus, in combination, a brake pipe, fluid pressure operable brake applying means, brake controlling means operable upon a reduction in brake pipe pressure to supply fluid under pressure to said brake applying means through a single passageway and thence through two parallel arranged communications of different flow capacities, a pressure retaining valve device, a pressure retaining pipe connecting said retaining valve device to said brake controlling means which is operative upon an increase in brake pipe pressure to open said passageway to said retaining pipe, a valve device operative in response to an increase in pressure to a chosen degree in said passageway to close communication through the one of said two communications of greater flow capacity and in response to a reduction in pressure in said passageway to a lower degree to open such communication, valve means controlling the other of said two communications and operable to either close same and open a vent from said brake applying means or open same and close said vent, manually operable means for actuating said valve means, means operable upon charging said brake pipe with fluid under pressure for automatically actuating said valve means to open the said communication of lesser flow capacity and to close said vent, and means for venting said retaining pipe upon operation of said valve means to open said vent from said brake applying means and to close the vent from said retaining pipe upon closing the vent from said brake applying means.

14. In a fluid pressure brake apparatus, in combination, a brake pipe, fluid pressure operable brake applying means, a brake application valve device operative upon a reduction in pressure of fluid in said brake pipe to supply fluid under pressure to said brake applying means for applying the brakes on a car and upon an increase in pressure of fluid in said brake pipe to release fluid under pressure from said brake applying means, valve means controlling communication through which said brake application valve device supplies and releases fluid under pressure to and from said brake applying means and having one position for opening said communication and another position for closing said communication and for venting fluid under pressure from said brake applying means, manually operative means for moving said valve means to either one of said positions, and means controlled by pressure of fluid supplied by said valve device for operating said brake applying means and operative upon reduction in such pressure to a chosen degree to move said valve means from said other position to said one position.

15. In a fluid pressure brake apparatus, in combination, a brake pipe, a brake cylinder pressure retaining valve pipe, fluid pressure operable brake applying means, a brake application valve device operable upon venting of fluid under pressure from said brake pipe to supply fluid under pressure to said brake applying means and upon restoration of pressure in said brake pipe to open said brake applying means to said retaining pipe for releasing fluid under pressure from said applying means, a retaining valve device connected to said pipe for retaining a chosen pressure of fluid therein, valve means controlling communication through which fluid under pressure is supplied to and released from said brake applying means by said brake application valve device and having one position for closing said communication and venting said brake applying means and another position for opening said communication and closing the vent from said brake applying means, means operative manually for moving said valve means to either said one or other position, means operative upon recharging of said brake pipe subsequent to effecting an application of brakes for moving said valve means from said other position to said one position, and means connecting said retaining pipe to said valve means for venting said retaining pipe in said one position of said valve means and for closing such vent in said other position.

16. In a fluid pressure brake apparatus, in combination, a brake pipe, fluid pressure operable brake applying means, a service application valve device operative on both a service and emergency reduction in pressure in said brake pipe, to open a quick service vent from said brake pipe and to also supply fluid under pressure to a communication for supply to said brake applying means, an emergency valve device operable upon an emergency reduction in brake pipe pressure to also supply fluid under pressure to said communication for supply to said brake cylinder, a normally open check valve in said vent, a normally open check valve past which fluid under pressure may flow from said communication to said brake applying means, a movable abutment subject on one side to pressure of fluid in said communication and on the opposite side to atmospheric pressure, a spring acting on said opposite side of said abutment, said abutment being operative upon a chosen increase in pressure in said communication to effect closure of both of said normally open check valves, and a restricted passage opening said communication to said brake applying means in by-passing relation to the second named normally open check valve.

17. In a fluid pressure brake apparatus, in combination, a brake pipe, means operable by fluid under pressure to effect application of brakes, a service application valve device operative upon both a service and an emergency reduction in brake pipe pressure to supply fluid under pressure to said means through a first communication and also to effect quick service venting of fluid under pressure from said brake pipe through a second communication, an emergency application valve device operative upon an emergency reduction in brake pipe pressure to also supply fluid under pressure to said means through said first communication, valve means normally opening said first and second communications and operative to close same in response to a chosen pressure of fluid in said first communication, said first communication comprising a first port at one side of said valve means connected to said valve device and a second port at the opposite side of said valve means connected to the first named means, and a third communication, of less flow capacity than said first communication, opening said first and second ports of said first communication to each other in by-passing relation to said valve means.

18. In a fluid pressure brake apparatus, in combination, a brake pipe, means operable by fluid under pressure to effect application of brakes, a service application valve device operative upon both a service and an emergency reduction in brake pipe pressure to supply fluid under pressure to said means through a first communication and also to effect quick service venting of fluid under pressure from said brake pipe through a second communication, an emergency application valve device operative upon an emergency reduction in brake pipe pressure to also supply fluid under pressure to said means through said first communication, valve means normally opening said first and second communications and operative to close same in response to a chosen pressure of fluid in said first communication, said first communication comprising a first port at one side of said valve means connected to said valve devices and a second port at the opposite side of said valve means connected to the first named means, a third communication, of less flow capacity than said first communication, opening said first and second ports of said first communication to each other in by-passing relation to said valve means, other valve means controlling said third communication having an open position for opening the communication and a closed position for closing the communication and venting fluid under pressure from the first named means, and manually operative means for effecting movement of said other valve means to its open and closed positions.

References Cited in the file of this patent

UNITED STATES PATENTS

| Number | Name | Date |
|---|---|---|
| 907,199 | Turner | Dec. 22, 1908 |
| 1,590,356 | Farmer | June 29, 1926 |
| 1,671,089 | Farmer et al. | May 22, 1928 |
| 1,693,943 | Thomas | Dec. 4, 1928 |
| 1,715,220 | Campbell | May 28, 1929 |
| 1,836,151 | Bickel | Dec. 15, 1931 |
| 1,880,864 | Dean | Oct. 4, 1932 |
| 1,938,248 | Fasoli et al. | Dec. 5, 1933 |
| 2,045,182 | Farmer et al. | June 23, 1936 |
| 2,048,327 | Farmer | July 21, 1936 |
| 2,055,102 | Hewitt | Sept. 22, 1936 |
| 2,055,967 | Campbell | Sept. 29, 1936 |
| 2,408,129 | Sudduth | Sept. 24, 1946 |
| 2,450,464 | Bent | Oct. 5, 1948 |
| 2,490,997 | Cook | Dec. 13, 1949 |